(No Model.) 10 Sheets—Sheet 1.
H. INMAN.
PAPER BOX MACHINE.
No. 539,480. Patented May 21, 1895.
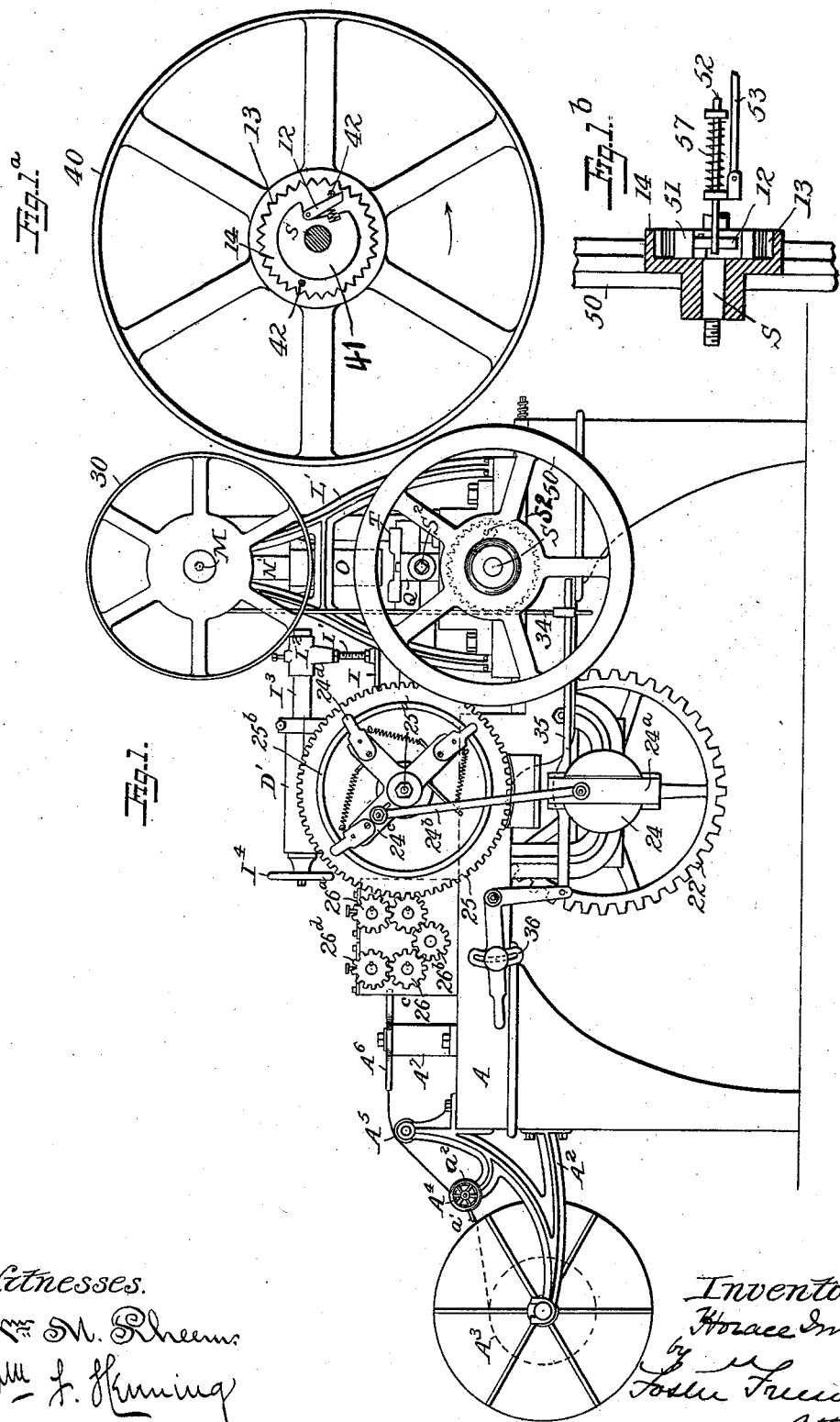

(No Model.) 10 Sheets—Sheet 2.
H. INMAN.
PAPER BOX MACHINE.
No. 539,480. Patented May 21, 1895.
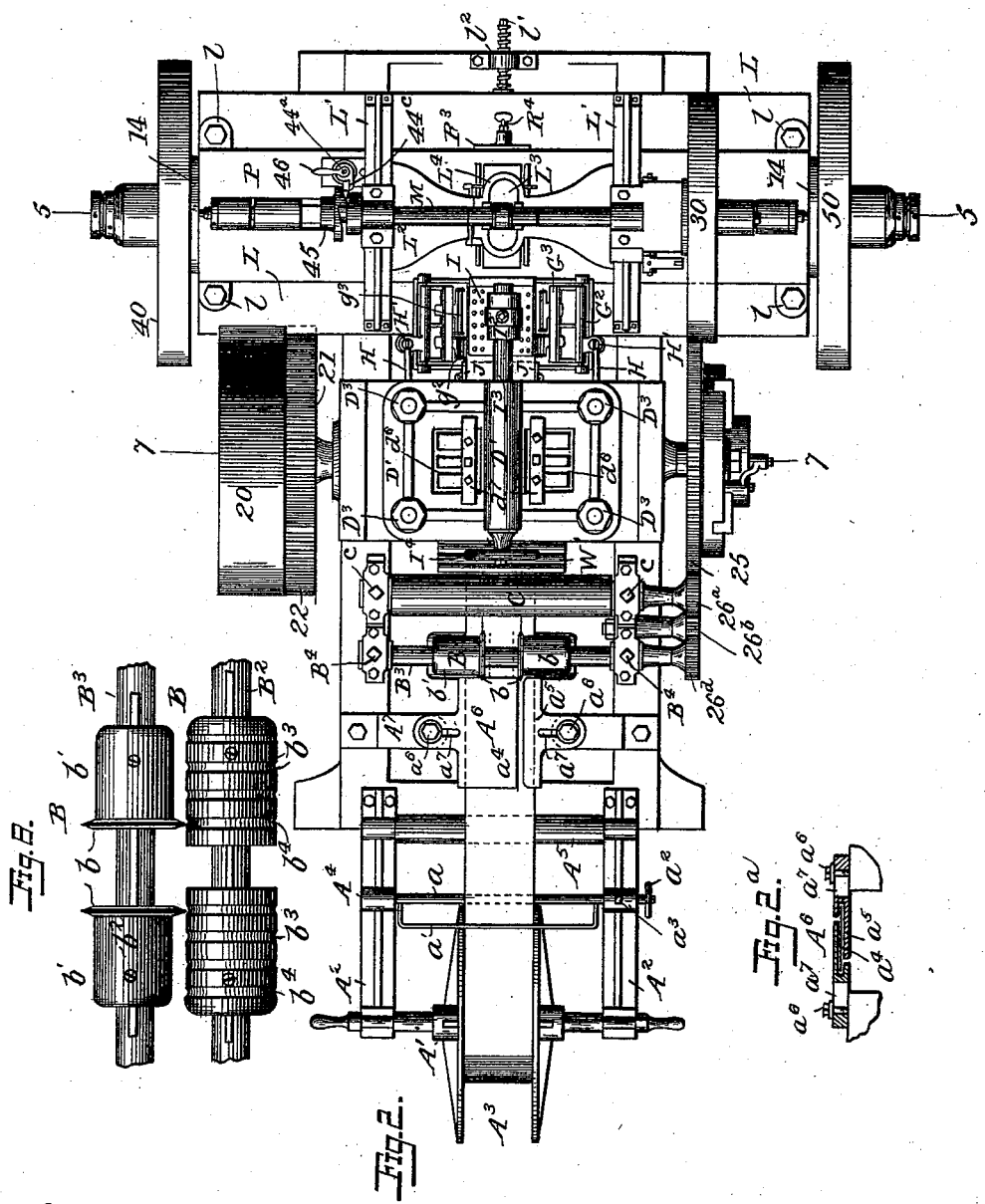
Witnesses. Inventor.
Horace Inman
by
Foster Freeman
Attorneys (No Model.) 10 Sheets—Sheet 3.
H. INMAN.
PAPER BOX MACHINE.
No. 539,480. Patented May 21, 1895.
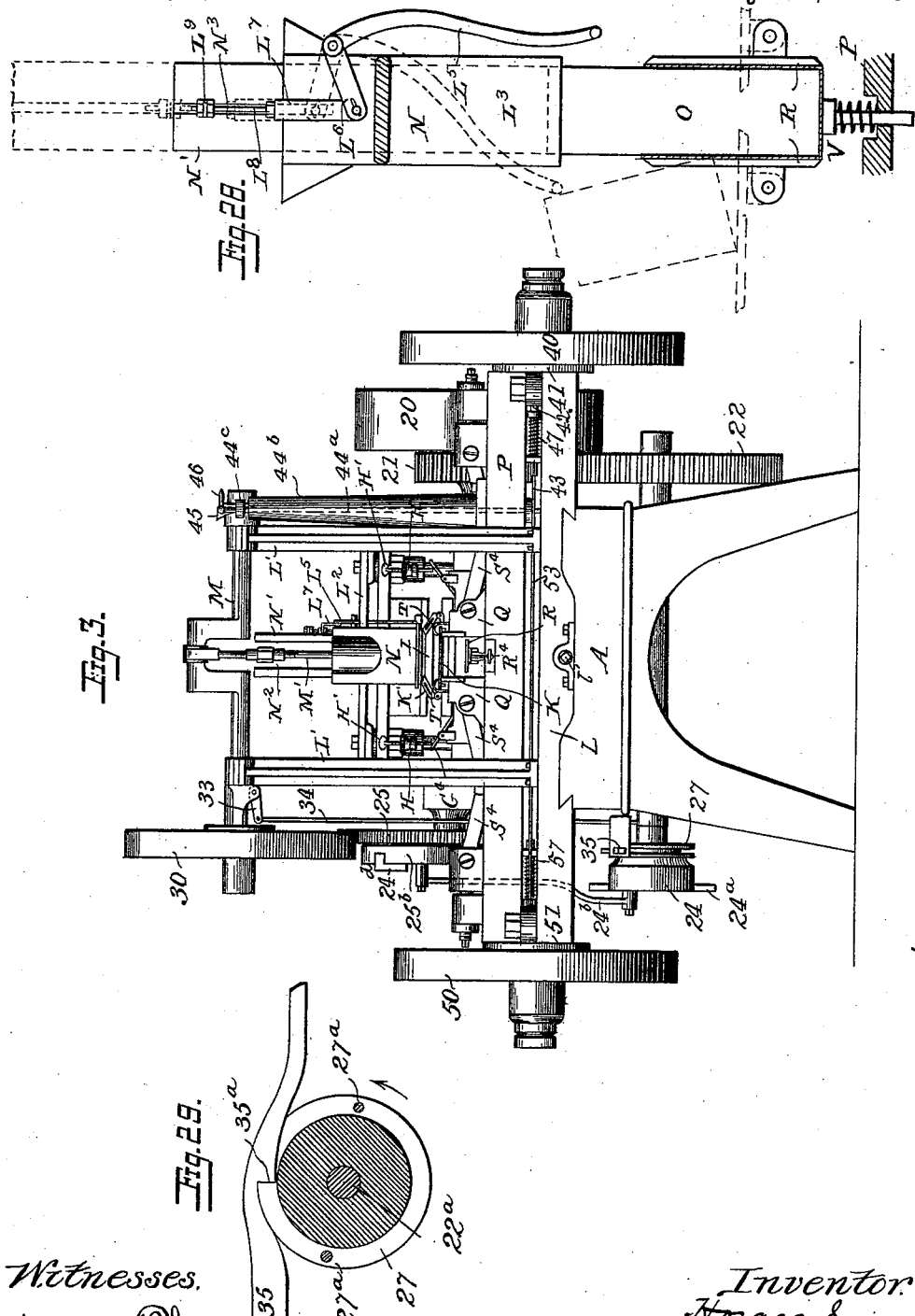
Witnesses.
Wm. M. Rheem
Wm. F. Heming
Inventor.
Horace Inman
by
Loller Freeman
Attorneys (No Model.)　　　　　　　　H. INMAN.　　　　　　10 Sheets—Sheet 4.
PAPER BOX MACHINE.
No. 539,480.　　　　　　　　　　　　　　Patented May 21, 1895.
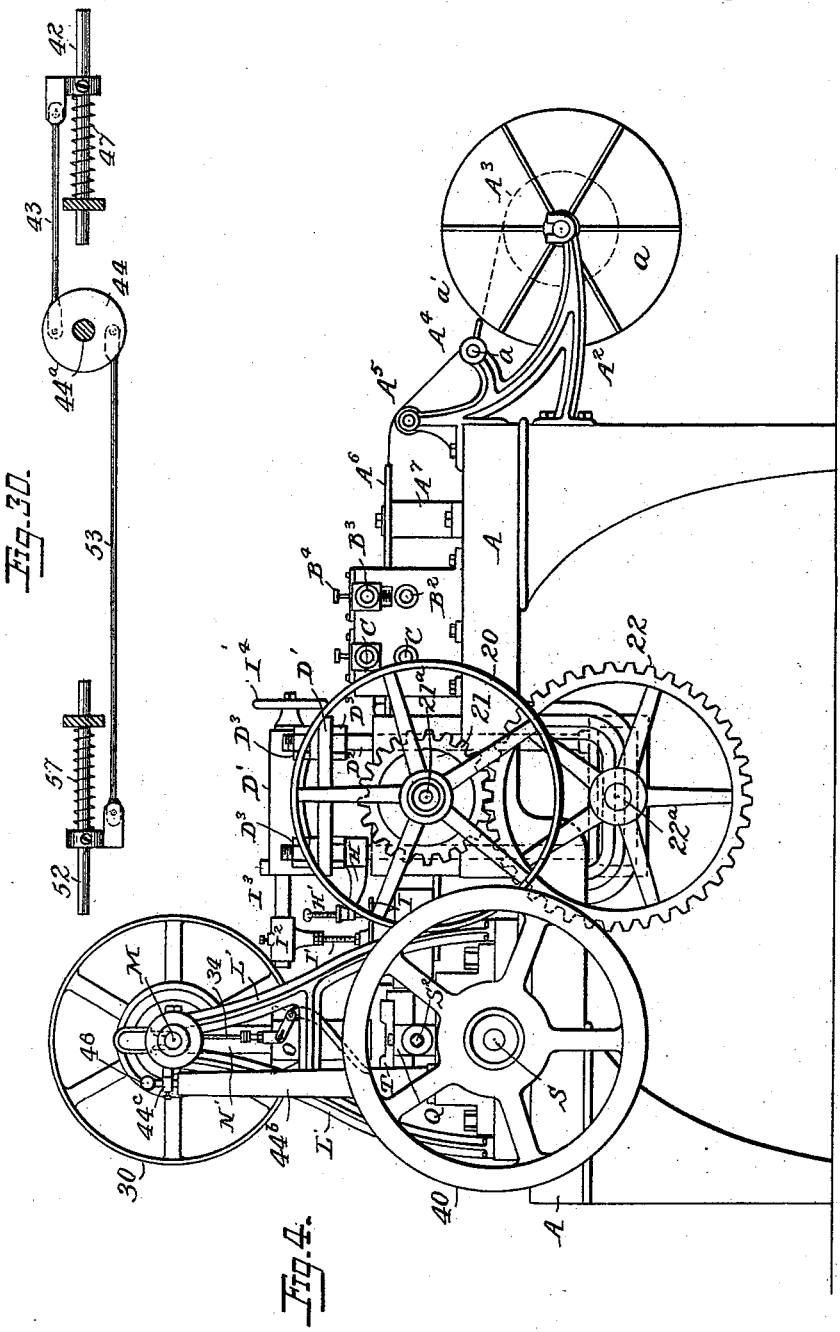

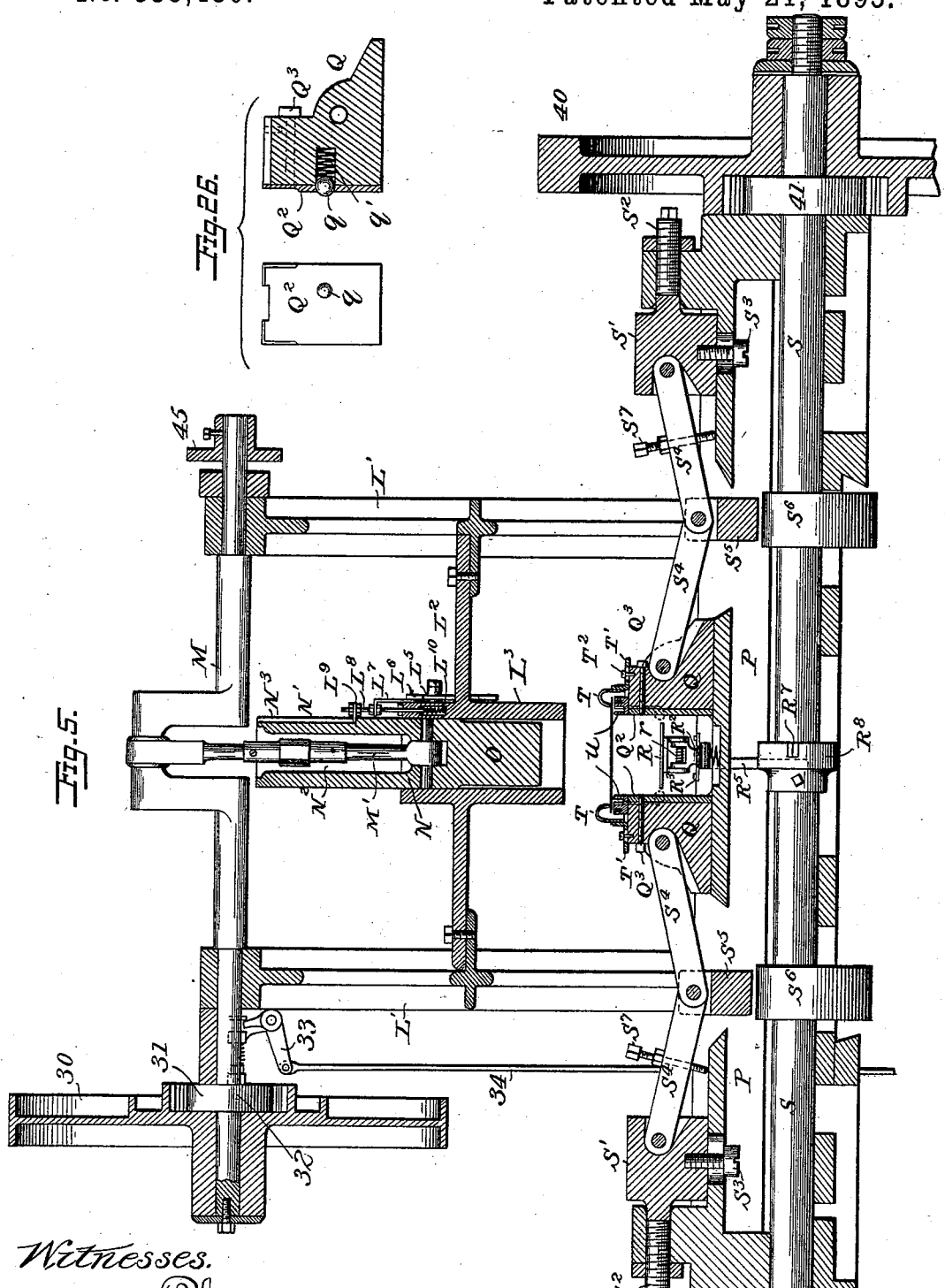

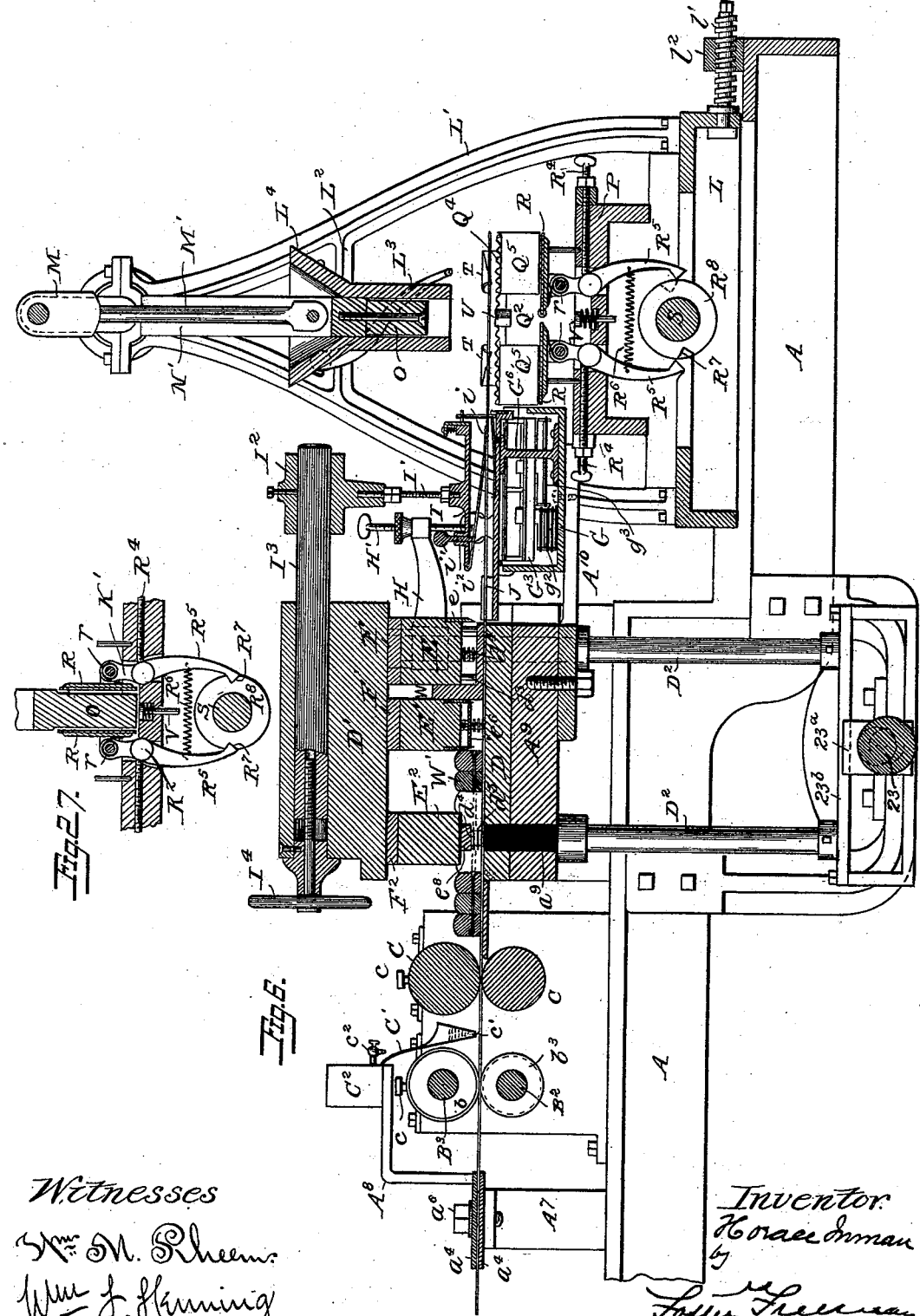

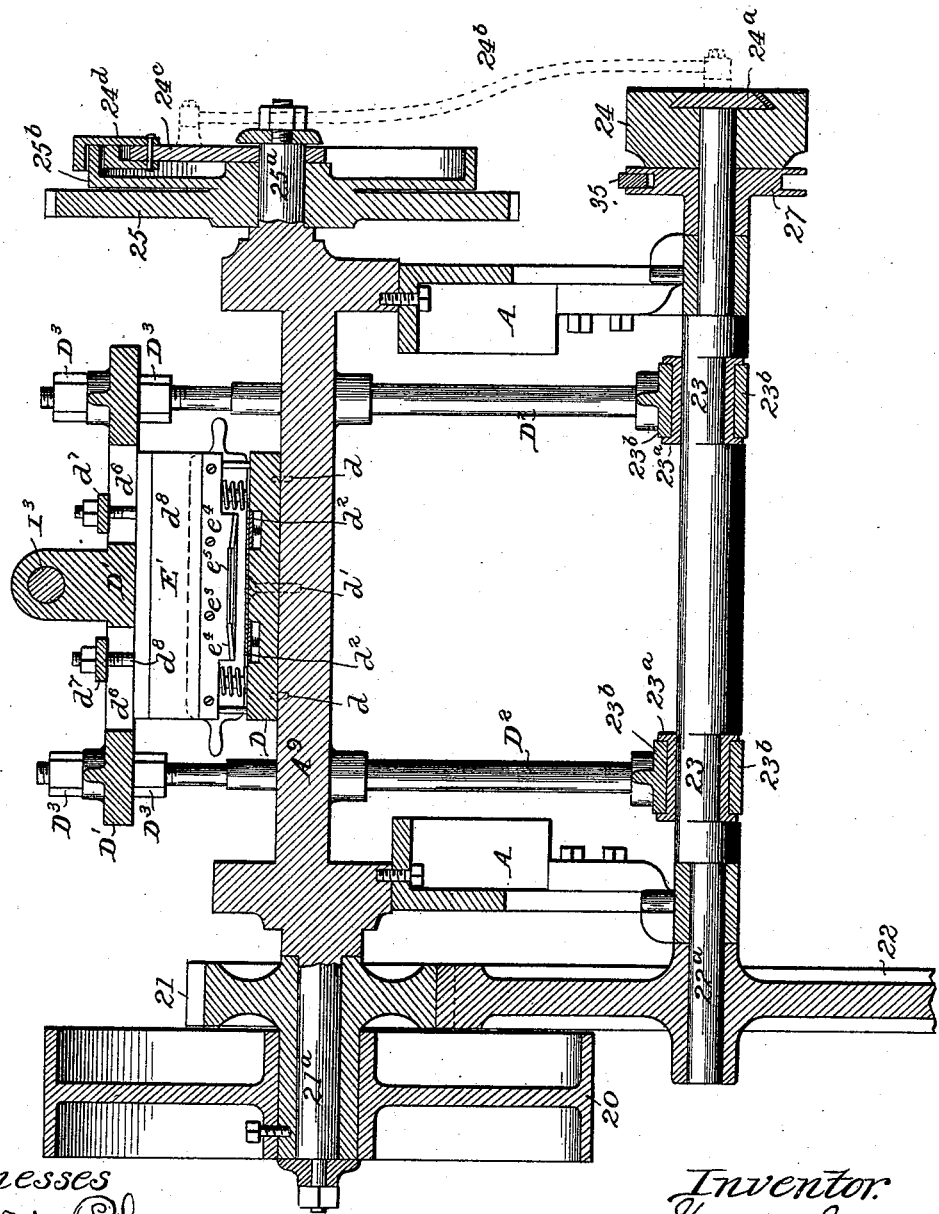

(No Model.) 10 Sheets—Sheet 8.
H. INMAN.
PAPER BOX MACHINE.
No. 539,480. Patented May 21, 1895.
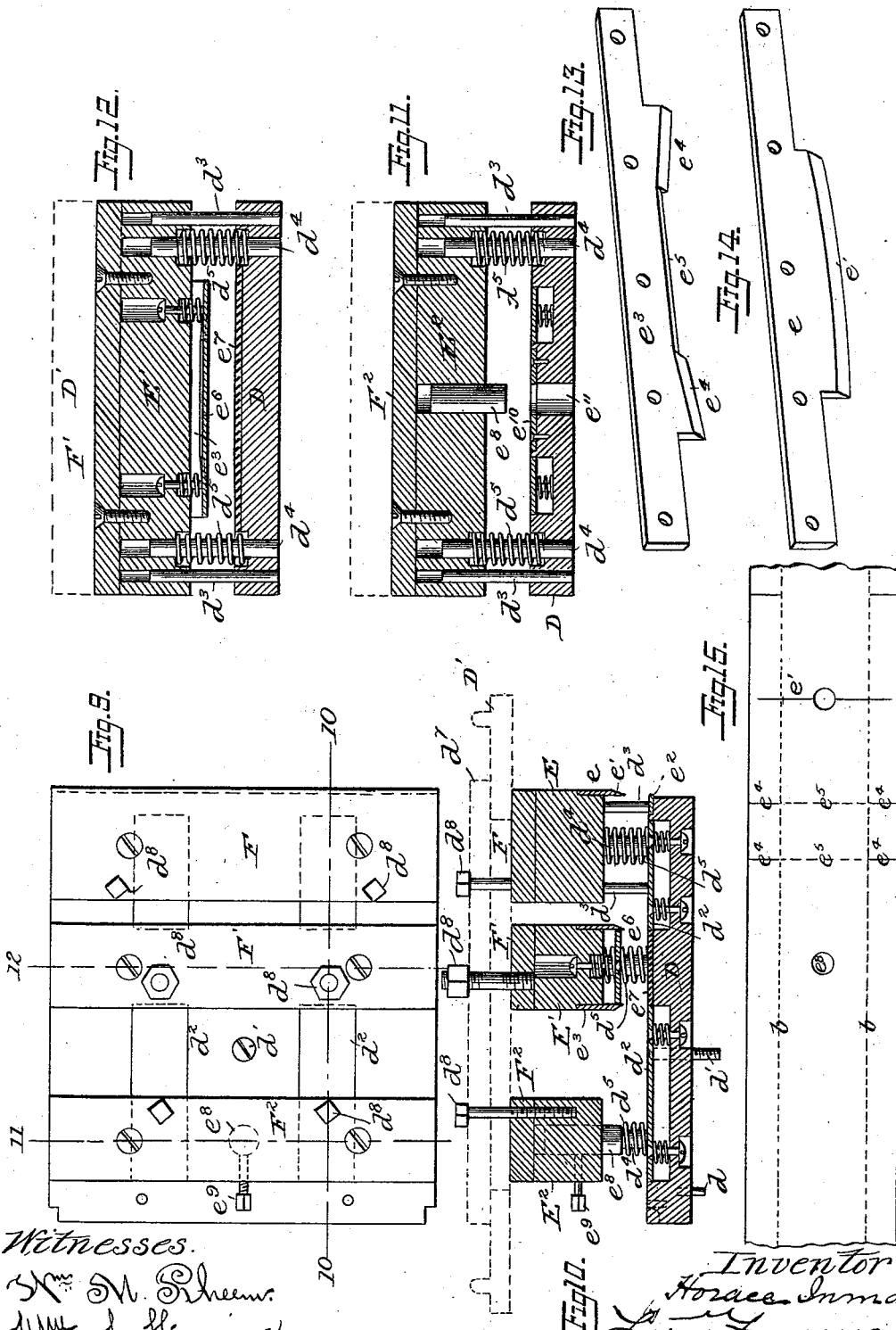

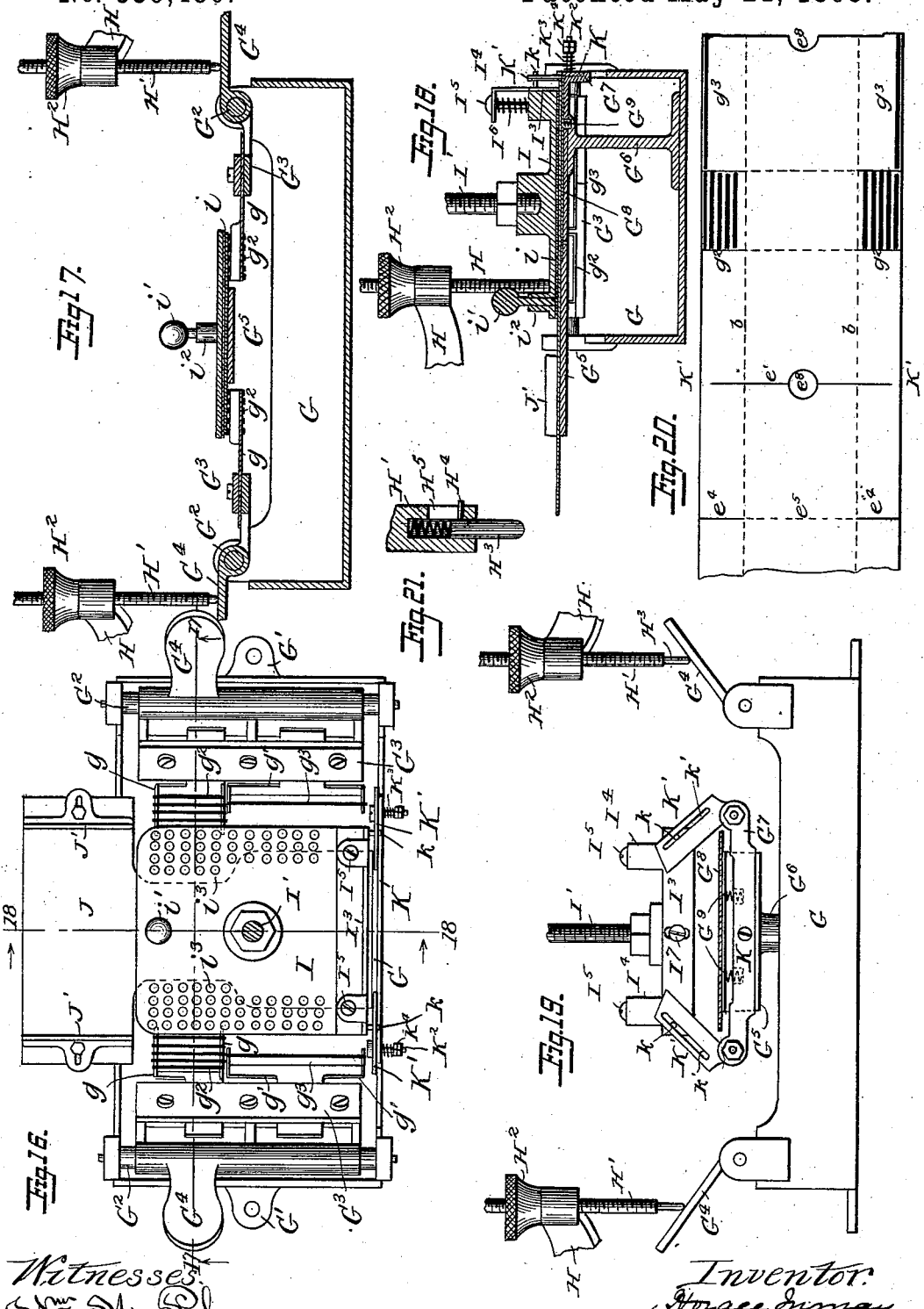

(No Model.) 10 Sheets—Sheet 10.
H. INMAN.
PAPER BOX MACHINE.
No. 539,480. Patented May 21, 1895.
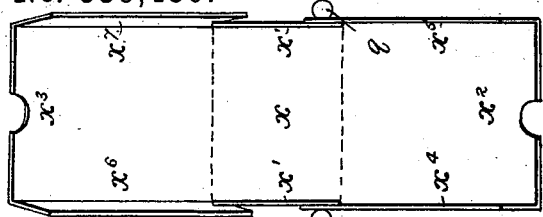
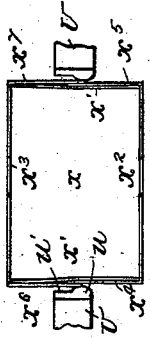
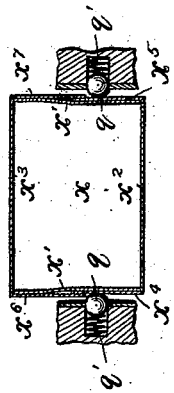
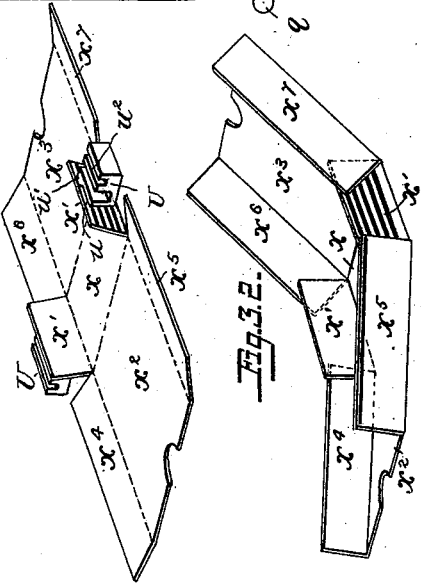
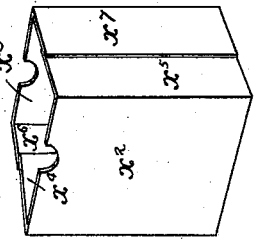
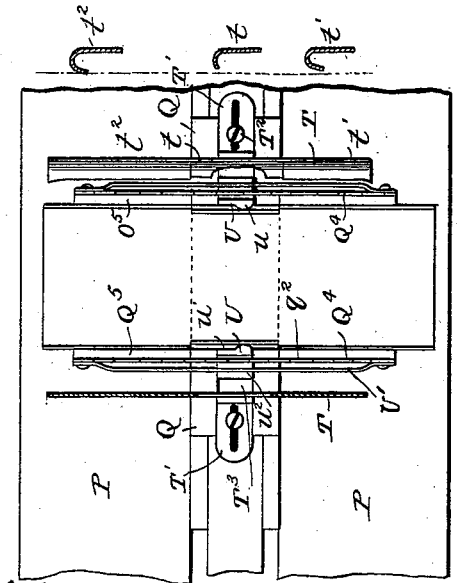
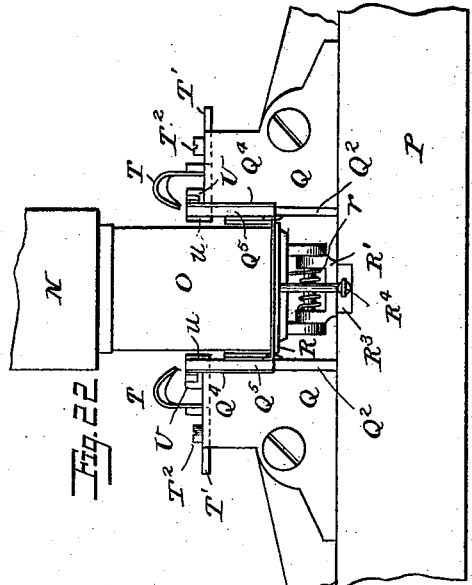
Witnesses.
Inventor.
Horace Inman
by Foster Freeman
Attorneys.

UNITED STATES PATENT OFFICE.

HORACE INMAN, OF AMSTERDAM, NEW YORK.

PAPER-BOX MACHINE.

SPECIFICATION forming part of Letters Patent No. 539,480, dated May 21, 1895.

Application filed July 14, 1894. Serial No. 517,609. (No model.)

*To all whom it may concern:*

Be it known that I, HORACE INMAN, a citizen of the United States, residing at Amsterdam, in the county of Montgomery and State of New York, have invented certain new and useful Improvements in Box-Machines, of which the following is a specification.

My invention relates to machines for making boxes out of paper, paste-board or similar material, and while it is adapted to make various forms, shapes and styles of boxes, it is more particularly adapted and is illustrated in the present instance for making what is generally known as telescopic boxes, and the object of my invention broadly stated is to provide a machine wherein boxes may be made from a continuous strip or roll of paper, the strip being formed into blanks which are properly manipulated and the complete box delivered from the machine, all the operations being automatic in their action.

My invention consists in the various features of construction and arrangement of parts, having the mode of operation substantially as hereinafter more particularly set forth.

Referring to the accompanying drawings, wherein I have illustrated one embodiment of my invention adapted to make telescopic boxes, Figure 1 is a side elevation of the machine. Fig. 1$^a$ is an enlarged inside view of the stop-motion pulley 40 on the end of the shaft S opposite the stop-motion pulley 50. Fig. 1$^b$ is a vertical part section showing part of the clutch-wheel 50, Fig. 1. Fig. 2 is a plan view of the machine. Fig. 2$^a$ is a cross-section of the guide A$^6$. Fig. 3 is an end elevation. Fig. 4 is a side elevation opposite to the side shown in Fig. 1. Fig. 5 is a vertical transverse section on the line 5 5, Fig. 2. Fig. 6 is a longitudinal vertical section through the center of the machine. Fig. 7 is a vertical transverse section of a portion of the machine on the line 7 7, Fig. 2. Fig. 8 is a detail view of the scoring and creasing rollers. Fig. 9 is a plan view of the cutting and scoring die. Fig. 10 is a vertical longitudinal section on the line 10 10, Fig. 9. Fig. 11 is a transverse vertical section on the line 11 11, Fig. 9. Fig. 12 is a similar view on the line 12 12, Fig. 9. Figs. 13 and 14 are enlarged perspective views of the cutters used in the cutting and scoring die. Fig. 15 is a plan view of the strip, showing the operation thereon of the cutting and scoring die. Fig. 16 is a plan view of the automatic pasting mechanism. Fig. 17 is a longitudinal vertical section on the line 17, Fig. 16. Fig. 18 is a vertical transverse section on the line 18, Fig. 16. Fig. 19 is an end view of the pasting mechanism. Fig. 20 is a reverse plan view of the strip, showing the application of the paste thereto. Fig. 21 is a detail of the paste-operating device. Fig. 22 is an enlarged elevation of the folding and squeezing device. Fig. 23 is a plan view of the same with the plunger removed. Fig. 23$^a$ is a detail showing cross-sections of different portions of the guides T. Fig. 24 is a plan view of the box and the guides for guiding the edge flap. Fig. 25 is a sectional view of the box and the squeezing-clamp. Fig. 26 is a plan and sectional view of the clamp. Fig. 27 is a detail sectional view of the side-folders and mechanism for operating them. Fig. 28 is a detail view of the plunger and ejector. Fig. 29 is an enlarged detail view of the device controlling the operation of the plunger. Fig. 30 is an enlarged detail showing the interlocking devices controlling the clutch operating the squeezing devices. Fig. 31 is a perspective view of the box-blank with the pasted edges turned up. Fig. 32 is a similar view showing a step in the operation. Fig. 33 is a perspective view of the completed box, and Fig. 34 is a plan of the partly-folded box.

As above indicated, the machine specifically illustrated is adapted especially to make telescopic boxes, and it will be seen that all the operations are automatic; the paper being fed, cut, scored, pasted, folded, compressed or squeezed and delivered as a complete box, or a complete portion of a telescopic box, and if desired the machine may be adapted to print or emboss any design upon the box or the blank or web so that the box is complete and ready for the market when delivered, although I have not shown the specific printing or embossing mechanism in the drawings, as any ordinary and well-known printing apparatus may be attached to the machine to be operated in proper time and in connection with the other devices.

The machine is also made so that the various parts can be adjusted to make boxes of various sizes, and so that all the operations will take place in proper time, and with proper relations to each other, and it is evident that by simply broadening the frame of the machine and practically duplicating more or less of the parts, more than one box can be made simultaneously, and the operations carried on concurrently, so that the two parts of an ordinary telescopic box can be delivered at the same time from the machine.

I will now proceed to describe more specifically and in detail the construction of the various parts of the machine and set forth their operative relations to each other, but it will be distinctly understood that I do not limit my invention to the precise details of construction and arrangement, as these can be varied to suit the requirements of any case, and parts of my machine may be used in combination with other parts or in combination with other equivalent parts which co-operate therewith to perform the various functions, in substantially the same general way.

The frame A, of the machine may be of any suitable material and construction, but is preferably of metal, and is of a convenient shape to support all the working parts and to permit of their adjustment. The paper or other material from which the boxes are to be made is suitably supported on a reel A', which is mounted in brackets $A^2$, connected to the main frame of the machine, and this reel is readily removable from the brackets in the ordinary manner, and is preferably provided with guiding wheels or flanges $A^2$, which support the sides of the roll and protect the edges of the paper strip.

In order that the paper may be straightened and be delivered to the box-forming devices in a practically flat and smooth condition, I provide a guide or straightener $A^4$ which also acts as a brake to the web of paper, as it passes from the reel, and in the present instance I have shown this as consisting of a shaft $a$, mounted in suitable bearings in the bracket $A^2$, and having connected therewith a U-shaped rod or bar $a'$, and provided with a hand-wheel $a^2$, and adjusting screw $a^3$, whereby its position can be regulated in the bracket, so that the paper passes under the U-shaped bar $a'$, and over the shaft $a$ and operates to straighten and smooth the paper, as well as to act as a sort of brake. Also mounted on the machine is a guide roller $A^5$, over which the paper is drawn at an angle, and this operates to further straighten and smooth the web of paper as it passes into the machine, and while this construction is simple and effective, it will be understood that the guide roller may be dispensed with and the paper lead directly from the brake to the machine. As it is also desirable to make the boxes accurate and evenly, it is exceedingly desirable that the web of paper should be fed to the cutting, scoring, and other devices in an exact position relative thereto, and I, therefore, provide an adjustable guide $A^6$, which is mounted on a cross-piece $A^7$. This guide is composed of two parts substantially alike, each having a relatively wide plate $a^4$, and a narrow plate or lip $a^5$, with a space between for the passage of the paper, and in this way the plates can be adjusted by the screws $a^6$, entering the slots $a^7$, so that they will accommodate themselves to paper of different widths, and at the same time substantially cover and protect the paper on both sides, they being arranged alternately, with their lips up and down, as shown in Fig. 2. From the guide-plate the paper is led to the scoring or creasing rolls B, B', mounted on suitable shafts supported in the main frame of the machine and driven in the manner hereinafter set forth. The shaft $B^2$, is in fixed bearings on the machine, while the shaft $B^3$, is supported in adjustable boxes, and these boxes are provided with some suitable means to adjust the relations of the shaft $B^3$, to shaft $B^2$, as the screws $B^4$, so that the relations of the scoring or creasing disks and bearing pieces can be accurately adjusted. The creasers or scorers $b$, are shown in the form of disks, mounted on hubs $b'$, which in turn are mounted on the shaft $B^3$, so as to be capable of sliding longitudinally thereon and be secured by a screw $b^2$, so that the lines of scores or creases will be in proper relation to the web of paper. Bearing-pieces $b^3$ are also suitably mounted so as to move longitudinally on the shaft $B^2$, and to be secured in position thereon, and they are provided preferably with a series of grooves $b^4$, into which grooves the scoring or creasing disks enter. It will be observed that in this way the disks may be adjusted not only with relation to the sides of the web, but so that the paper will be simply creased, or when desired, it can be scored as it passes between the rollers.

Mounted also on the frame A, are the feed rollers C, C, driven by suitable power and operating to feed the web into the machine, and the upper feed roller is mounted in adjustable boxes controlled by some suitable means, as the screw $c$, so that a sufficient bite or pressure upon the paper can be attained to insure a positive and accurate feed.

Sometimes the paper used is of such a nature that it is desirable to dampen or moisten it before it is manipulated to form the box, in order prevent its breaking while being bent or folded, and for this purpose, I provide one or more dampers C', which are shown in the present instance as mounted on a bracket $A^8$ (see Fig. 6) on which is also provided a reservoir $C^2$ for water or other fluid, and a suitable regulating cock $c^2$, for supplying the moisture to the dampers C', and these may be provided with some absorbent material $c'$ at their lower ends which shall come in contact with the face of the paper and dampen it sufficiently for the purposes intended. It will be understood that this damper is not necessary in all kinds of paper, and it may be used or not according to the requirements of any particular case.

Arranged adjacent the feed rollers is a cutting and scoring mechanism, and this comprises a bed-plate D, which is mounted upon a cross-piece $A^9$, attached to the main frame, and arranged above the bed-plate is a plate D', which is supported upon the guide and draw rods $D^2$, there being four shown in the present instance. These rods pass through the plate $A^9$ and the plate D' is adjustably mounted on their upper ends by means of jam screws $D^3$, or similar devices. This plate D' is reciprocated vertically through the medium of the rods $D^2$, and the operating mechanism hereinafter described. The bed-plate D, should be accurately adjusted on the frame $A^9$, and I have shown dowel pins $d$, and screws $d'$ for this purpose. The plate is also recessed and provided with spring-actuated followers $d^2$, which yield under the downward pressure of the cutters. Mounted on this bed-plate are guide pins $d^3$, which serve to guide and register the cutter heads E, E', $E^2$, and also mounted on the bed-plate are the pins $d^4$, surrounded by springs $d^5$, which tend to raise the cutter heads after they are forced down by the plate D'.

The cutter head E, is provided with a cutter $e$, having a central cutting surface $e'$, which is preferably curved, as shown in Fig. 14, and this co-operates with a cutting plate $e^2$, secured to the bed-plate D. This cutter $e'$, operates on the strip to form the cut $e'$, Fig. 15, which extends transversely of the web of paper, but preferably not completely across, leaving filaments or connections between the outer ends of the cut and the edges of the strip, so that the preceding box-blank is not completely severed from the strip by this operation.

The cutter head E', is provided on its opposite lower edges with a combined cutter, creaser or scorer $e^3$, preferably having inclined cutting edges $e^4$, and a scoring edge $e^5$, between the cutting edges, and arranged between these cutters is a spring-actuated follower $e^6$. These cutters $e^4$ co-operate with a cutter $e^7$, which is preferably made wide enough to serve as a co-operating cutter with both of the cutters $e^3$, although of course, it may be made in separate strips and attached to the bed-plate in proper position to co-operate with the separate cutters. It will be observed that these cutters $e^3$, score or crease the web of paper transversely on the lines $e^5$, Fig. 15, while they cut slots $e^4$, in the outer edges of the strip, and the followers $d^2$, are of a width to correspond with the cutting edges $e^4$, and are depressed when the cutter E', descends. The cutter head $E^2$, carries a punch $e^8$, which is adjusted in a socket by a screw $e^9$, and co-operates with a cutter plate $e^{10}$, fitted over an opening $e^{11}$, in the bed-plate, and punches or cuts the hole $e^8$ in the blank Fig. 15, which subsequently forms the finger-hole at the upper edges of the open end of the box. Of course, it will be understood that in some cases, it is not necessary to form this finger-hole, in which case the punch $e^8$, is omitted.

It will be observed that the frame $A^9$, has an opening $a^9$, corresponding to the opening $e^{11}$, in the bed-plate, so that the chips or punchings pass down through the opening, and do not interfere with the operation of the punch or die.

While the die, comprising the bed-plate and the cutter-heads connected thereto by the guide piece and supported by the springs, can be used without other connections, being forced down by the plate D' and restored to their normal position by the springs, I find it advantageous in some instances to connect the cutter heads to the plate D', to aid and insure the operation of the springs. Thus I have shown the plate D', as provided with openings $d^6$, and on the upper side of the plate are arranged loose bars $d^7$, and passing through these bars are the screws $d^8$, entering the various cutter heads, and serving to positively lift the heads, if perchance the springs $d^5$ have not sufficient power to do so.

The bed-plate and the cutter heads attached thereto can be readily removed from the machine and another bed-plate and cutters and other parts differently arranged for different sized boxes be substituted in place thereof, and it will be observed that the openings $d^6$, in the plate D', are of sufficient size to allow the bars $d^7$, to be adjusted to meet the requirements of the various dies which may be used in the machine. In the drawings I have also shown above the cutter heads and attached to each one of the heads a plate F, F', $F^2$, but these are not absolutely necessary and may be omitted, although I prefer to interpose them between the cutter heads and the plate D', especially when the heads are secured to the adjustable bars $d^7$.

In order that paste, glue, or other suitable adhesive material may be applied to the box-blank in proper position, I provide a pasting apparatus, which consists essentially of a vat or box G, which is shown as mounted on an arm $A^{10}$, secured to the cross-piece $A^9$, of the frame, and the box is adjustably secured thereto by means of suitable lugs G'. The paste is to be applied in this machine on the under side of the blank, and in order to do this I mount in the paste-box two pasters, they being shown as supported on the shafts $G^2$, carrying rocking blades $G^3$, which are provided on their outer edges with thumb-like projections $G^4$, by means of which they are operated in the manner hereinafter set forth. These pasting blades carry the pasters, which are adjustably secured therein, and while various forms of pasters may be used, I have shown the pasters as composed of strings, cords or wires, stretched between suitable supports on the pasting blades. Thus, projecting from and secured to the pasting blades are the wires $g$, and $g'$, and mounted on the wires or arms $g$, are a series of threads, cords, or wires $g^2$, and mounted on the arms $g'$ in the present instance, is a single cord $g^3$, this being the preferred arrangement in connection with the particular box described. It will be seen on reference to Fig. 20, that paste is applied by the cords $g^2$, on the under surface of the cut ends of the web, in a series of lines, while on the intermediate portion or one of the sides of the box there is but a single line of paste $g^3$, produced by the corresponding single cord $g^3$. Of course, it will be understood that there may be more lines of paste, and they may be differently arranged, according to the requirements of any particular case. The normal position of the pasters is indicated in Fig. 19, with the pasting cords immersed in the paste, and at the proper time, the pasting blades are brought into the position shown in Fig. 17 to apply the paste on the under side of the strip. In order that this may be accomplished at the proper time, I provide arms H, which are adjustably secured to the reciprocating rods $D^2$, and move therewith, and are provided at their free ends with a screw-threaded pin H', having a set nut $H^2$, for securing the pin in the arm H. These pins H' are preferably recessed at their bottom, and in these recesses fit the pin-points $H^3$, they being arranged to slide under spring pressure therein, their movements being controlled by a stud $H^4$ in the slot $H^5$. It will thus be seen that when the rods $D^2$, are brought downward, the arms H moving therewith, bring the pin-points $H^3$ in contact with the thumb-like projections $G^4$, and raise the pasting devices from the vat and press the threads or cords against the under side of the strip to apply the paste thereto, and by the construction above described, the pins H' can be accurately adjusted, and by the use of the spring-actuated pin-points the pressure of the pasting devices against the strip is elastic. I have found this a most satisfactory way of applying paste, as in the construction and arrangement of my machine it is desirable to apply but a small quantity of relatively thin adhesive material to the parts, the adhesion depending not so much upon the quantity of adhesive material used as upon the pressure with which the parts are brought in contact to cause them to properly adhere in the manner hereinafter set forth.

In order that the strip may be properly supported over the pasting vat, I provide the vat with a plate $G^5$, which is supported on a standard $G^6$, mounted in the vat, and in this instance preferably projecting beyond the front edge of the pasting vat. Mounted on this edge is a guide J, having lateral guides J', which are adjustable thereon to insure the accurate feeding of the paper to the pasting devices. It is also desirable to clamp the paper against the plate $G^5$, while the paste is being applied thereto, and while various devices may be used for accomplishing this purpose, I have shown a plate I, adjustably connected by a screw I', to a sleeve $I^2$, which in turn is shown as adjustably connected to a rod $I^3$, sliding in an opening in the central and thicker portion of the plate D', and provided with a hand-wheel and screw $I^4$, by means of which the rod can be adjusted in the plate. It is not absolutely necessary to have the two adjustments thus shown, although it is preferable. It will be seen, therefore, that as the plate D' reciprocates, the presser plate I reciprocates therewith and clamps the web of paper against the plate $G^5$. It is also desirable to have some sort of pressure on the paper when it is being fed forward, to prevent buckling or wrinkling, and for this purpose I provide the plate I with a plate $i$, secured to one edge of the plate I, and normally bearing on the top of the paper strip. This plate may be hinged or otherwise attached at one edge, and in order to aid gravity, I provide a weight $i'$ which fits loosely in the socket $i^2$ in the upper edge of the plate I, and tends to force the bearing plate $i$ against the paper, but yields under pressure as the plate I is forced downward. Further, as a refinement and in order to prevent suction of the plate I on the box, I provide its edges with a series of holes or openings $i^3$. This plate also serves as a support or abutment for the paper or material while paste is being applied, as set forth.

It will be observed that so far in the form shown in Fig. 20, the box-blank has not been completely severed from the web, and in order to do this and sever the blank previous to the one being pasted, I have shown a cutting device mounted on the rear end of the plate $G^5$, that end being bent downward to form a good support $G^7$ for the cutters, as shown in Figs. 18 and 19. Mounted on this support is a bar K, having pivoted at its outer ends the cutters K', and these are conveniently operated by the reciprocating presser plate I which in this instance is provided with a plate $I^3$, having pins or projections $k$ entering slots $k'$ in the cutters and causing them to operate to sever the filaments between the two adjacent box-blanks when the plate I is carried downward. These filament-cutters K', are preferably connected to the bar K, with which they coact to sever the box blank by friction pivots comprising the pivot rods $K^2$, having a spring $K^3$, mounted thereon and held in position by the nuts $K^4$, so that by adjusting the nuts the cutters are held in spring contact against the bar K. The plate $I^3$, carrying the pins $k$, engaging the filament-cutters, is also spring controlled, being provided with extensions $I^4$, sliding over screws $I^5$, actuated by springs $I^6$, the plate being movable on the carrier I, so as to permit the same to yield against the springs $I^6$, to prevent clamping of the filament-cutters, and to release them or open them under spring pressure, while they may be positively closed, the plate $I^3$, being free to slide against the end of the plate I, the screw $I^7$, moving in a slot in the plate. Secured to the plate $G^5$, and fitted in a recess therein, is a spring plate $G^8$, and this is supported on springs $G^9$, so that normally the end of the plate $G^8$, adjacent the filament-cutters is raised, as shown in Fig. 19, but when the plate I, is depressed, clamping the box strip between the plates I and $G^5$, to receive the paste, and to cut the filament, the end of plate $G^8$, is depressed, as illustrated in Fig. 18, the springs $G^9$, yielding, and when the plate I, is raised, these springs tend to raise the end of the plate $G^8$, to strip the box strip from the filament cutters. It will be understood that sometimes the blank is completely severed before it is pasted, but in order that it can be fed forward with greater accuracy, I preferably leave the filaments heretofore described connecting the blanks, and sever them with the cutters K', or equivalent devices. The box strip having been thus cut, scored and pasted, is next fed to the folding, pressing and delivering apparatus, and while this apparatus may be variously constructed and arranged to accomplish the purpose desired, I have shown an arrangement of devices especially adapted for the peculiar shaped box, which I will now proceed to describe in detail.

Adjustably mounted on the main frame A, is a base plate L, from which rise the standards L', supporting the crank shaft M, carrying the plunger N. Also mounted in a stretch-piece $L^2$, is a guide or throat $L^3$, for the plunger, the upper edges $L^4$, of which are extended to permit the pitman M', to operate freely therein. The plunger N may be variously formed, but is preferably provided with upward extensions N', to act as a guide or follower for the plunger in the throat-piece, and the pitman moves in the slot $N^2$, between the guides. Detachably connected to the plunger is a former O, and this can be of various sizes to correspond with the box being made, and by substituting for the former shown one of a different size, the plunger and its connecting mechanisms need not be changed, the throat-piece and plunger being of a size sufficient to accommodate a former of the largest sized box capable of being made on the machine. The folding devices and the pressing devices are mounted on a bed P, which is secured to the bed-plate L, as by bolts or rivets $l$, and is adjustable with the bed-plate L to and from the pasting and other mechanisms by suitable means, as a screw $l'$, mounted in a bearing $l^2$, on the main frame A. The blank for forming the paper box is fed under the plunger and is folded, going through the various steps hereinafter set forth, and the pasted edges are compressed to cause them to firmly adhere together, and in order that these operations may be more readily understood, I will first refer to the blank shown in Figs. 31 and 32. In the blank the part $x$, represents the bottom of the box, while the parts $x'$ are the flaps connected to the bottom of the box. The parts $x^2$, $x^3$, constitute the sides of the box, while the flaps $x^4$, $x^5$, $x^6$, $x^7$ are the flaps connected to the sides which form what I have termed the ends of the box. The problem now is to so fold the box that the bottom flaps $x'$ will be turned up, as seen in Fig. 32, and the flaps $x^4$, $x^5$, and the flaps $x^6$, $x^7$ shall be caused to overlap the bottom flaps $x'$ and overlap each other, so that the pasted surfaces will come in proper contact to be subjected to the pressure whereby they may be united to form the box. Indicated in Fig. 33. Mounted in the bed-plate P and arranged to reciprocate therein are the clamps Q, which also operate in the first instance as folders for the bottom flaps $x'$. These clamps, as best shown in Figs. 5 and 26, are provided with face plates $Q^2$, which are secured in any suitable way, as by screws $Q^3$, and which may be interchangeable and made of various thicknesses, and mounted in a recess in these clamps is a ball $q$, under the tension of a spring $q'$, which projects slightly beyond the face of the plates $Q^2$, and is arranged at one side of the central line, as clearly indicated in Fig. 26. Mounted between the clamps Q, are the side folders R, and these are provided with a hinge joint, by means of which they are connected to a yoke-piece R', Fig. 22, which is provided with side extensions $R^2$, arranged in a slot in the bed plate, and held in position by strips $R^3$, and are adjusted in the slot by the screws $R^4$, passing through the bed, which screws form a fulcrum for the yoke-pieces. Also connected to the yoke-pieces are downwardly extending arms $R^5$, which are under the tension of a spring $R^6$, and their ends are provided with projections arranged to take into the notches $R^7$, in a collar $R^8$, mounted on a shaft S. The hinges of the plates R are provided with a spring $r$, which tends to maintain the plates in a horizontal position, as shown in Fig. 6, with their inner ends projecting toward each other, as shown. Mounted on the clamps are guides T, which are made of suitable material, as metal, and are shaped substantially as indicated in Figs. 22 and 23, and these are each supported directly upon a sliding plate T', adjustably mounted on the top of the clamps and secured by a screw $T^2$, so that the guides can be moved to or from the former, as desired. These guides aid in controlling the turning up of the flaps forming the ends of the box, in the manner hereinafter described. These guides as shown are made in three curved sections $t$, $t'$, $t^2$, substantially corresponding to the flaps of the box. The curve of the sections $t$, is slightly less than the curve of the other sections, so that the flaps $x'$, will escape from the guides before the flaps of the side pieces $x^2$, $x^3$. Furthermore, the section $t'$ is shown as being a little less in length than the section $t^2$, and the curve is slightly more expanded, so that the flaps $x^4$, $x^5$, will escape as soon as and preferably a little sooner than the flaps $x^6$, $x^7$, although this is a refinement, which is not necessary. These curves are illustrated in connection with Fig. 23, by the section lines indicated thereon. I do not limit myself to these precise curves or constructions of these guides, as I find that various forms will operate with more or less efficiency, and it is not absolutely necessary to have the side flaps escape at different times, although it is preferable to have the bottom flaps escape from the guides before the side flaps. Also mounted in the clamps Q, are the cam-shaped blocks U, and these are arranged to slide in the channel $T^3$, in which the clamps or guides T, are adjusted. These blocks have a cam face, with a rounded projection $u$, best seen in Fig. 24, and a cut-away portion $u'$, and they are mounted upon suitable springs, so that they will yield as the flaps pass by them. I have shown a leaf spring $U'$, the central portion of which takes in a notch $u^2$, Figs. 5 and 23, in the face of the block, and the ends of the springs are secured to lateral extensions $Q^4$, mounted on the clamps Q, and these extensions are shown in the form of metallic plates having corrugated edges $q^2$, and secured to these plates $Q^4$, are filling pieces $Q^5$, so that their faces will be practically in line with the face of the clamps, and it will be understood that the spring $U'$ tends to maintain the blocks in the position shown in Fig. 22, but they yield slightly under pressure from the end flaps of the box, but tend to hold the flaps against the lower end of the former, as hereinafter set forth. Also mounted in the bed P, centrally beneath the plunger is a spring-actuated pin V, which yields from pressure of the plunger when the box is being folded, but tends to raise the box, and causes it to follow the plunger to aid in its discharge, after it is complete.

The box is stripped from the plunger by the guide or throat $L^3$, and in order to discharge it from the machine, I provide a knock-off $L^5$, in the form of a bent wire hinged to the throat $L^3$, and provided with an arm $L^6$, connected to a pitman $L^7$, having an adjustable rod $L^8$, which is provided with a projection $L^9$, moving in a groove $N^3$, in the side of the plunger N, and so arranged that just as the plunger reaches its uppermost position, the projection reaches the lowermost extremity of the slot $N^3$, causing the pitman to be raised, and moving the knock-off arm $L^5$, in the manner indicated in Fig. 28, to throw the box out of the machine. A spring $L^{10}$ is shown mounted in a recess in the throat piece $L^3$, which tends to restore the knock-off arm to the position shown in full lines, Fig. 28.

The clamps Q, are operated by some suitable mechanism to compress the sides of the box after it has been folded, and cause the adhesive matter to firmly unite the flaps, and in order to best do this, as before intimated, I make use of a relatively small quantity of adhesive matter and depend upon the great pressure to cause the parts to adhere, so that they practically become embedded together, forming an exceedingly firm and substantial union, and in this way it is not necessary to allow time for the adhesive matter to dry, as the box is ready for use the moment it is discharged from the machine. In order to secure the requisite amount of pressure, I have shown the clamps as operated by means of toggle joints. Thus, mounted on the bed P, are the blocks $S'$, which are adjustable by the screws $S^2$ and screws $S^3$, which latter pass through slots in the bed plate. Connected to the clamps Q, and the adjustable blocks $S'$, are the toggle levers $S^4$, and these are connected at their point of junction to bearing blocks $S^5$, which are arranged to be operated by the cams $S^6$ on the shaft S, and it will be seen that when the shaft S, is rotated, the cams coming in contact with the bearing blocks, raise the point of junction of the toggles, and exert an enormous pressure on the clamps bearing on the completely folded box surrounding the plunger. Adjustable pins $S^7$, may be connected with the toggle levers to regulate the downward movement of the bearing blocks $S^5$, and consequently the lateral movement of the clamps away from the plunger, so that just sufficient space may be given for the proper folding of the flaps of the box around the plunger, according to the character of the paper or other material used and the size of the plunger.

Such being the general construction of the embodiment of my invention shown in the drawings, some means must be provided for operating the various parts at proper times and in proper relations to each other, and while various means may be used, I will now proceed to describe those illustrated.

It may be remarked that I preferably operate the different mechanisms from different driving pulleys, there being four shown in the present instance, and these are connected by suitable belts or otherwise, with a shaft overhead, and the pulleys rotate continuously and are connected by suitable clutch mechanisms with other operating parts, and these clutches are controlled so that the parts will operate in proper time to perform their function while the pulleys are rotating continuously. Any suitable clutch or stop motion may be used, but in Figs. 1, and $1^b$, I have shown a form which I prefer, in which the shaft S, carries a disk 51, having a spring-actuated pawl 12, connected therewith, which when uncontrolled will engage with the internal rack 13, on the flange 14, on the driving wheel 50, which driving wheel is loosely mounted on the shaft S. Mounted in suitable relation with the shaft and wheel is one or more pins 52, which control the operation of the pawl 12. Thus, in the position shown in Fig. 1, one of the pins 52 (see Fig. 30), is moved to a position to intercept the pawl 12, as the shaft rotates, and throw the pawl out of engagement with the internal rack 13, and the shaft, of course, stops, while the driving wheel 50 can revolve freely on the shaft S; but when the pin 52, is withdrawn, the pawl is immediately thrown outward by the spring into engagement with the internal rack 13, and the shaft S, is rotated with the wheel until the pawl is again thrown out of engagement by impinging upon a pin 52, thrown into its path. This stop motion or clutch can be used with all of the driving pulleys, and I have not deemed it necessary to illustrate the details of construction in each case, as its application, or the application of an equivalent device for the same purpose will be readily understood by those skilled in the art.

What may be termed perhaps the main driving pulley 20, is mounted upon the sleeve of a gear 21, which is mounted on a stud $21^a$, connected to the frame A, and this gear engages a gear 22, mounted on a shaft $22^a$. This shaft, as seen in Fig. 7, is provided with eccentrics 23, on which are mounted the boxes $23^a$ sliding in a guide-way $23^b$, connected to the draw-rods $D^2$ for operating the cutting and scoring mechanism in the manner before described. Also mounted on the shaft $22^a$, is a disk 24, having an adjustable sliding plate $24^a$, mounted in its face, to which is attached a connecting rod $24^b$, the other end of which is attached to a clutch-arm $24^c$, mounted on a pin $25^a$, which supports the intermittent driving gear 25. This gear is provided with a flange $25^b$, with which the clutch $24^d$, engages when the clutch-arm $24^c$ is moved in one direction, and over which it slips when the clutch is moved in the other direction, in a manner well understood. While but a single clutch-arm may be used, I preferably provide several (three being shown in the drawings, see Fig. 1), each provided with a clutch $24^d$, and in this way I insure an accurate and positive movement of the intermittent feed gear 25, for if one clutch does not instantly bite against the flange, one of the others will, and great accuracy of movement is thereby attained.

The clutch shown is a well-known form of clutch for this purpose, and need not be described in detail, it being understood that when the rod $24^b$ is moved downward, the clutch engages the flange, moving the gear 25, and when it moves in the other direction, the clutch slips, allowing the gear to remain stationary, and the amount of movement of the gear 25 is controlled by the adjustment of the sliding plate $24^a$. The intermittent gear 25, meshes with a pinion 26 on one of the feed rolls C, and the pinion $26^a$, connects with the other feed roll, so that they are driven in opposite directions. An idler $26^b$, connects the pinion 26 with the pinion $26^c$, on the scoring or creasing shaft $B^2$, and the pinion $26^d$ meshes therewith and is mounted on the shaft $B^3$ of the cutter or scorer. It will thus be understood that the pulley 20 rotates continuously and through the medium of the connecting gear the shaft $22^a$ rotates and the intermittent gear 25 is operated at regular intervals from said shaft, and this in turn operates the rotary cutting and scoring and feeding devices in unison, so that as the web is fed forward by the feed rolls, it is scored longitudinally, and then while the intermittent gear 25 is at rest, the eccentrics 23 on the same shaft operate the reciprocating scoring and cutting devices through the medium of the draw-rods $D^2$, and it will be seen that these operations bear a positive relation to each other. It will also be observed that the pasting devices are operated through the medium of the rod $I^3$ and its connection, which move with the reciprocating scoring devices.

The pulley 30, is loosely mounted on the crank shaft M which operates the plunger, and there is a clutch 31, of a construction similar to that shown in Fig. $1^a$, secured to the shaft, and the pins 32 of this clutch are controlled by the bell-crank lever 33, connecting rod 34, and lever 35, which is pivoted to a bell-crank adjusting lever 36. This lever 35 is formed with a notch $35^a$ (see Fig. 29) and normally rests in the groove in a pulley 27, secured to shaft $22^a$, which pulley has one or more pins $27^a$, and it will be seen that when the shaft is rotated in the direction indicated in Fig. 29, one of the pins $27^a$, will impinge upon the lever 35 at regular intervals and raise it, and thus through its connections, will withdraw the clutch pins 32 from the clutch 31, allowing the pawl of the clutch to engage with the pulley 30, and rotate the crank shaft M at the proper time. In the present instance it is desirable that the plunger connected to the crank shaft M shall be held for a certain length of time both in its elevated position and in its depressed position, and for this reason I provide two pins $27^a$, which will operate the lever 35 twice at each rotation of the shaft $22^a$ and cause the crank shaft M to make a half revolution, and then to be held stationary a certain time, to allow sufficient dwell or time for the other operations, and then to make another half revolution and again dwell, so that it will be seen that normally the clutch 31 is operated twice at each complete rotation of the shaft $22^a$.

It will be understood, of course, that the pulley 30 can rotate at a greater speed than the speed of rotation of shaft $22^a$, so that the plunger may be moved quickly up or down, and a longer or shorter dwell obtained. If for instance, it is desirable for any reason to disconnect the crank shaft M and stop its operation, by operating the bell-crank lever 36, the lever 35 is moved in such a position that the pin or pins $27^a$ will come under the notch $35^a$ and will not lift the lever 35, and consequently not operate the clutch pins 32, and it will thus remain until the bell-crank lever 36 is again adjusted to its normal position, when the operations will continue as before.

It will be obvious that the operation of the clamps should be properly timed with relation to the operation of the plunger. In other words, they should remain in their expanded or open position until the plunger has reached its lowermost position and folded the box in proper shape, when they should be thrown into operation to squeeze the sides of the box against the plunger and cause them to adhere, and I, therefore, arrange to operate the clamps automatically from and in unison with the operation of the crank shaft M.

I have shown the shaft S as provided with two loose driving pulleys 40, 50, although one is sufficient, but two give a more even motion and pressure on the clamps. These pulleys are provided with suitable clutch mechanisms, substantially like those heretofore described, as 41, 51, having pins 42, 52, controlling the pawls of the respective clutches, which are not shown in detail. These pins, when both clutches are used, are connected together in the manner indicated in Fig. 30, by connecting rods 43, 53, which are pivoted to a plate 44, mounted on a shaft $44^a$, so that they will be operated in unison. This shaft $44^a$ is shown (Fig. 3) as extending up through a column, and has at its upper end a finger or extension $44^c$ (Fig. 2) which is arranged in position to be struck by a crown cam 45, mounted on an extension of the crank shaft M, and a handle 46 is also connected to the shaft $44^a$ so that the shaft may be operated by hand if desired. It will thus be understood that as the crank shaft M rotates, the cam 45 impinges upon the finger or extension $44^c$, partially rotating the shaft $44^a$, and with it the plate 44, and this operates one or more of the clutch pins 42, 52 to connect the shaft S with the driving pulleys 40, 50, one or both, as the case may be, so that the said shaft S is rotated and the cams $S^6$ will operate the toggle levers $S^4$ to move the clamps Q to perform the squeezing or pressing operation, uniting the edges of the box. The springs 47, 57 surrounding the pins, tend to hold them in proper position when not positively operated by the crown cam 45, or the handle 46.

Sometimes it is found desirable in order to keep the paper perfectly straight and smooth in its passage through the machine, to provide weights which will rest on the upper surface of the paper, and I have shown a weight W, arranged between the cutter heads E, E', and resting loosely on top of the strip of paper, and in some instances I provide a weight W' which is shown as consisting of a number of bars loosely connected together and resting on top of the paper strip. These may be removed or changed as desired, and are simply used to prevent any buckling or bending of the paper strip, and insure the accurate register of the cuts and scores, and thereby avoid any waste of material.

The operation of the machine may be described as follows: The material from which the box is made is fed intermittently into the machine, being drawn in by the feed rolls, the paper when in the form of a strip being guided and straightened by the guides and straighteners, and the longitudinal creases or scores are formed in the strip in a manner hereinbefore so fully set forth that it seems unnecessary to repeat. It will be understood that the strip is fed forward intermittently, and these various operations, as well as the application of paste to the under side of the strip in the desired places, are accomplished preferably before the box-blank is completely severed from the strip, and this blank is severed by the cutters connected to the paste box and operated by the presser-plate, and the blank rests over the clamps Q, with its edge folds under the guides T. The plunger is then caused to descend, and its first operation is to press the bottom $x$ of the box downward, and the bottom flaps $x'$ are first withdrawn from the guide T, and through the medium of the cam-shaped blocks U, they are pressed closely against the sides of the plunger, as best illustrated in Fig. 23. Meanwhile, as the plunger descends, the flaps $x^4$, $x^5$, are preferably withdrawn from the guides T, and then the flaps $x^6$, $x^7$ (although these operations may be practically simultaneous) and on account of the extensions and filling pieces $Q^4$, $Q^5$, these flaps are folded up substantially at right angles to the sides of the box.

It will be understood that in the form of box shown, the flaps $x^4$, $x^5$, are to be outside of the flaps $x'$, but inside of the flaps $x^6$, $x^7$, and in order to accomplish this as the plunger descends, the spring-actuated balls $q$ yield to the flaps $x^4$, $x^5$, as above indicated in Fig. 25, but tend to press them closely against the flaps $x'$, and the sides of the plunger. Meanwhile, the side folders, which have been in a horizontal position, are reached by the plunger and box, and the further depression of the plunger causes these folders to assume the position shown in Fig. 27, and in doing this the balls $q$, still press the flaps $x^4$, $x^5$ closely against the plunger, while the cut-away portions $u'$ of the guides U direct the flaps $x^6$, $x^7$, so that they will overlap the flaps $x^4$, $x^5$, as indicated in Fig. 24 and assume the proper positions as the plunger moves to the extreme limit of its motion. When this position is reached, the pin V, is depressed, the side folders are pressing the sides of the box against the former, thus holding the flaps in proper position when the clamps, through the medium of the toggle joints squeeze the flaps together, securing a perfect union of the parts through the medium of the adhesive material and pressure. The plunger then retreats, the pin tending to start the box and cause it to follow the plunger, the side folders are loosened by the arms $R^5$, entering the notches $R^7$, in the collar $R^8$, which is now in the position shown in Fig. 27, and are restored to their horizontal position by the springs, and the box stripped from the plunger by the throat $L^3$, the knock-off arm throwing it out of the machine complete. As before stated, these operations are properly timed and are automatically controlled with relation to each other, and it will be observed that there is a sufficient dwell in the different operations to secure the best results.

While the various parts may be driven from one main shaft, I find it much more advantageous to provide the several driving pulleys with automatic clutches, as it is desirable to have them operate at different speeds, and I avoid a somewhat complex train of gear in order to accomplish the results desired.

It is understood that a printing de vi can readily be attached to the machine, so that the box can be delivered with proper printed matter thereon, when necessary.

It is further to be understood that the details of construction of the various parts may be varied, and parts may be used in combination with other parts or in combination with other equivalent mechanisms, so that a single machine is adapted to perform the necessary operations to make boxes of varying sizes and shapes, and suitable for various purposes.

What I claim is—

1. The combination with the bed-plate having recesses provided with cutting plates and spring followers, of the cutter heads, guide pins between the bed-plate and cutter heads, springs for moving the cutter heads, and the cutters mounted on the cutter heads co-operating with the cutting plates on the bed-plate, substantially as described.

2. The combination with the bed-plate having recesses provided with spring followers and with cutting plates secured to the bed-plate, of cutter heads connected to said bed-plate by pins, one of the heads carrying a cutter having a central cutting portion and another cutter head carrying two cutters each having a central creasing portion and a cutter portion at each side of the creasing portion, substantially as described.

3. The combination with the bed-plate, of the cutter heads connected thereto and co-operating therewith, one cutter head carrying a cutter having a central cutting portion, another cutter head carrying two cutters each having a central creasing portion and cutting portions at each side of the creasing portion, and another cutter head carrying a punch, substantially as described.

4. The combination with the bed-plate having longitudinal recesses and spring followers therein and provided with cutting plates, of cutter heads connected to the bed-plate, one head carrying a cutter having a central cutting portion, another cutter head having two cutters each having a central creasing portion and a cutting portion opposite each side of the creasing portion, a spring follower arranged between the last two cutters, and a third cutter head carrying a centrally arranged punch, substantially as described.

5. The combination with the bed-plate carrying cutter plates, of the cutter heads mounted thereon and carrying cutters co-operating with the cutter plates, the reciprocating plate having a slot, the loose bars arranged above the reciprocating cutter plate, and the connections between the loose bars and the cutter heads, substantially as described.

6. The combination with the reciprocating plate having an opening or openings therethrough, of the loose bars arranged above the openings, the interchangeable dies comprising the bed-plate and cutter heads, and the connections between the cutter heads and the loose bars, substantially as described.

7. The combination with the reciprocating plate, of the dies comprising the bed-plate and cutter heads, one cutter head carrying a punch arranged to form an opening in the strip of material passing through the die, another cutter head carrying the combined creasing and cutting blades and arranged to make transverse creases and flap-cuts, and another cutter head carrying a central cutter arranged to make a transverse cut substantially across the material being operated upon, substantially as described.

8. A pasting apparatus for a paper box machine, comprising a vat, pivoted blades, wires supported by said blades, and cords supported on said wires, substantially as described.

9. A pasting apparatus for a paper box machine, comprising a vat, pivoted blades, wires carried by said blades, cords mounted on said wires, and projections connected to the blades whereby they may be operated to apply the paste to the under side of the material, substantially as described.

10. The combination with the pasting vat and blades, of a plate arranged above the blades to support the material while being pasted, and a presser-plate secured to said plate, substantially as described.

11. The combination with the paste vat and pasting blades, of a plate arranged above the blades to support the material while being pasted, and a weighted presser-plate connected to said plate, substantially as described.

12. The combination with the paste vat and paster blades, of a standard having a plate secured thereto between the blades, and a reciprocating plate above the blades whereby the material is held in position while the paste is being applied to the under side, substantially as described.

13. The combination with the vat and pasters, of the filament-cutters connected to the vat, a reciprocating pressure plate above the vat, and connections between the plate and cutters for operating the latter, substantially as described.

14. The combination with the vat and pasters, of a standard and plate attached thereto, the filament-cutters connected to said plate, a reciprocating pressure plate above the vat, and connections between the plate and cutters for operating the latter, substantially as described.

15. The combination with the reciprocating cutting and scoring device, of the adjustable paste vat, pasters mounted therein having projections or thumb-pieces, arms connected with the reciprocating cutting and scoring device, and adjustable connections carried by the arms and arranged to operate the pasters, substantially as described.

16. The combination with the reciprocating cutting and scoring device and pasting device, of a presser-plate connected to the cutting and scoring device and arranged to operate therewith to hold the material while being pasted, substantially as described.

17. The combination with the reciprocating cutting and scoring device and adjustable pasting device and pasters therein, of an adjustable presser device connected to the cutting and scoring device to operate therewith, and adjustable paster-operating devices also connected to the cutting and scoring device to operate therewith, substantially as described.

18. The combination with a cross-piece connected to the frame, of a reciprocating plate, draw-rods connected to said plate and passing through the cross-piece, a paster connected to the cross-piece, a presser connected to the reciprocating plate and operating in connection with the paster, and devices for operating the pasters connected with the draw-rods, substantially as described.

19. The combination with the cross-piece, the reciprocating plate, the draw-rods connected to the plate and passing through the cross-piece, and means for operating the same, of a paste vat connected to the cross-piece, pasters mounted therein, a presser-plate adjustably connected with the reciprocating plate, and paster-operating devices adjustably connected with the plate, substantially as described.

20. The combination with the cross-piece, the reciprocating plate, the draw-rods, and means for operating them, of the dies for cutting and scoring the blank, the paster, the presser, and the paster-operating mechanism connected to the reciprocating plate so that the dies, presser, and pasters operate simultaneously on the material, substantially as described.

21. The combination with the reciprocating creaser and scorer, the paste-vat and pasters therein, of paster-operating devices connected to and moving simultaneously with the creaser and scorer, and folding, pressing and delivering devices adjustable with relation to the creaser and scorer, substantially as described.

22. The combination with the reciprocating former, of the side folders operated by the former to fold the sides of the box against two opposite sides of the former, means for folding the overlapping flaps against the intermediate sides of the former, and clamps for pressing the overlapping flaps against the sides of the former, substantially as described.

23. The combination with the former, of blank-folding mechanism comprising clamps, and the cam-shaped blocks, substantially as described.

24. The combination with the former of blank-folding mechanism comprising clamps, and the spring-actuated balls, substantially as described.

25. The combination with the former and clamps, of the guides mounted on the clamps, the cam-shaped blocks, and the spring-actuated balls, substantially as described.

26. The combination with the former and clamps, of the guides adjustably mounted on the clamps, the cam-shaped blocks also mounted on the clamps, and the spring-actuated balls mounted in recesses in the clamps, substantially as described.

27. The combination with the former, of the cam-shaped blocks, the clamps, and the tilting side folders, substantially as described.

28. The combination with the former, of the guides formed in three sections corresponding to the flaps of the box, the central section being constructed to release the flaps controlled thereby before the other flaps are released, substantially as described.

29. In a paper box machine, the combination with intermittently operating scorers or creasers, of reciprocating cutters and scorers, a stationary paste vat and means for intermittently operating the pasters simultaneously with the operation of the reciprocating cutting and scoring device, a reciprocating plunger, side folders operated by the plunger, and squeezing clamps carrying devices for folding the side and end flaps, substantially as described.

30. In a paper box machine, the combination with intermittently operating feed rolls, of a clutch mechanism connected to operate the feed rolls, a reciprocating cutting and scoring device and means for intermittently operating the same, a paste device, a plunger and means for intermittently operating the same controlled by the operation of the reciprocating cutter and scorer, squeezing devices, and means for intermittently operating the same controlled by the operation of the plunger, substantially as described.

31. In a paper box machine, the combination with the feeding, scoring and pasting mechanisms and means for intermittently operating them, of a plunger and means for intermittently operating it, a squeezer and independent means for intermittently operating it, and automatic controlling devices whereby the plunger and squeezing devices are automatically operated in accordance with the movements of the cutting and scoring device, substantially as described.

32. In a paper box machine, the combination with the feeding, scoring and pasting devices, of a driving pulley and connections for intermittently operating said devices, a plunger, an independent driving pulley and connections for intermittently operating the plunger, a squeezing device, an independent driving pulley and connections for intermittently operating the squeezing device, and means for controlling the operation of the plunger and squeezers automatically, substantially as described.

In testimony whereof I have signed my name to this specification in the presence of two subscribing witnesses.

HORACE INMAN.

Witnesses:
A. B. COPLEY,
E. B. CLARK.